US010282597B2

(12) United States Patent
Zhang et al.

(10) Patent No.: US 10,282,597 B2
(45) Date of Patent: May 7, 2019

(54) IMAGE CLASSIFICATION METHOD AND DEVICE

(71) Applicant: Xiaomi Inc., Beijing (CN)

(72) Inventors: Tao Zhang, Beijing (CN); Fei Long, Beijing (CN); Zhijun Chen, Beijing (CN)

(73) Assignee: XIAOMI INC., Beijing (CN)

(*) Notice: Subject to any disclaimer, the term of this patent is extended or adjusted under 35 U.S.C. 154(b) by 192 days.

(21) Appl. No.: 15/359,192

(22) Filed: Nov. 22, 2016

(65) Prior Publication Data
US 2017/0154208 A1 Jun. 1, 2017

(30) Foreign Application Priority Data
Nov. 27, 2015 (CN) .......................... 2015 1 0846109

(51) Int. Cl.
G06K 9/00 (2006.01)
G06K 9/62 (2006.01)

(52) U.S. Cl.
CPC ..... *G06K 9/00288* (2013.01); *G06K 9/00228* (2013.01); *G06K 9/6222* (2013.01)

(58) Field of Classification Search
CPC .................. G06K 9/00288; G06K 9/00228
USPC ......................................................... 382/118
See application file for complete search history.

(56) References Cited

U.S. PATENT DOCUMENTS

| 2006/0104520 | A1* | 5/2006 | Kraus | G06F 17/30265 |
| | | | | 382/225 |
| 2010/0266166 | A1* | 10/2010 | Kawahara | G06K 9/00295 |
| | | | | 382/118 |
| 2011/0007975 | A1* | 1/2011 | Kazama | G06K 9/00234 |
| | | | | 382/225 |
| 2014/0320699 | A1 | 10/2014 | Chiang | |
| 2015/0199560 | A1 | 7/2015 | Gokturk et al. | |

FOREIGN PATENT DOCUMENTS

| CN | 101414348 A | 4/2009 |
| CN | 101515234 A | 8/2009 |
| CN | 101673346 A | 3/2010 |
| CN | 102147851 A | 8/2011 |
| CN | 102722698 A | 10/2012 |
| CN | 102799901 A | 11/2012 |
| CN | 102831413 A | 12/2012 |
| CN | 103034714 A | 4/2013 |
| CN | 103177102 A | 6/2013 |

(Continued)

OTHER PUBLICATIONS

Gourier, Nicholas et al., Estimating Face orientation from Robust Detection of Salient Facial Structures, Jan. 1, 2004, XP-002681890.*

(Continued)

*Primary Examiner* — Justin P. Misleh
(74) *Attorney, Agent, or Firm* — Brinks Gilson & Lione

(57) ABSTRACT

The present disclosure relates to an image classification and clustering method and device. Two images containing human faces may be classified into one cluster or different clusters based on a cluster merging threshold adaptively determined according to the combinational face poses in the two images. The adaptive cluster merging threshold help reduce false positive and false negative classification of human face containing images into clusters.

11 Claims, 13 Drawing Sheets

(56) References Cited

FOREIGN PATENT DOCUMENTS

| CN | 104252618 A | 12/2014 |
|----|-------------|---------|
| CN | 104317932 A | 1/2015 |
| CN | 105096377 A | 11/2015 |
| CN | 105488527 A | 4/2016 |

OTHER PUBLICATIONS

International Search Report dated Oct. 9, 2016 for International Application No. PCT/CN2016/087562, 5 pages.
English Translation of International Search Report dated Oct. 9, 2016 for International Application No. PCT/CN2016/087562, 6 pages.
Extended European Search Report dated May 11, 2017 for European Application No. 16199522.0, 11 pages.
Gourier, Nicolas et al., "Estimating Face Orientation from Robust Detection of Salient Facial Structures," 2004, printed from the internet at <http://www.prima.imag.fr/Prima/Homepages/jlc/papers/Pointing04-Gourier.pdf>, on Aug. 14, 2012, 9 pages.
Guha, Sudipto et al., "CURE: An Efficient Clustering Algorithm for Large Databases," Management of Data, ACM, 1998, pp. 73-84.
Karypis, George et al., "Chameleon: Hierarchical Clustering Using Dynamic Modeling," IEEE Computer Society, vol. 32, No. 8, 1999, pp. 68-75.
Office Action dated Jul. 2, 2018 for Chinese Application No. 201510846109.1, 5 pages.

* cited by examiner

IMAGE CLASSIFICATION METHOD AND DEVICE

CROSS-REFERENCE TO RELATED APPLICATIONS

This application is based upon and claims priority to Chinese Patent Application CN201510846109.1, filed Nov. 27, 2015, the entire content of which is incorporated herein by reference.

TECHNICAL FIELD

The present disclosure generally relates to the technical field of image identification, and more particularly, to an image classification/clustering method and an image classification/clustering device.

BACKGROUND

With continuous development of technologies, smart terminal devices such as smart phones may be capable of implementing more complex functions. A user may utilize a smart phone to take photos of himself/herself or others, and may also download photos stored in his/her external storage space or others' storage space to a local storage on the smart phone.

SUMMARY

The present disclosure provides image classification methods and image classification devices.

In one embodiment, an image classification method is disclosed. The method includes acquiring two images containing face feature information; determining face pose information for each of the two images according to a pre-established face pose classification model; determine an angular face relationship between the face pose information in each of the two images; determining an adaptive target cluster merging threshold value between the two images according to the angular face relationship; and classifying the two images based on the determined adaptive target cluster merging threshold value.

In another embodiment, a terminal device is disclosed. The terminal device includes a processor and a memory in communication to the processor for storing instructions executable by the processor, wherein the processor is configured to: acquire two images containing face feature information; determine face pose information for each of the two images according to a pre-established face pose classification model; determine an angular face relationship between the face pose information in each of the two images; determine an adaptive target cluster merging threshold value between the two images according to the angular face relationship; and classify the two images based on the determined adaptive target cluster merging threshold value.

In yet another embodiment, a non-transitory readable storage medium comprising instructions is disclosed. The Instructions, when executed by a processor in a terminal device, cause the terminal device to acquire two images containing face feature information; determine face pose information for each of the two images according to a pre-established face pose classification model; determine an angular face relationship between the face pose information in each of the two images; determine a adaptive target cluster merging threshold value between the two images according to the angular face relationship; and classify the two images based on the determined adaptive target cluster merging threshold value.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
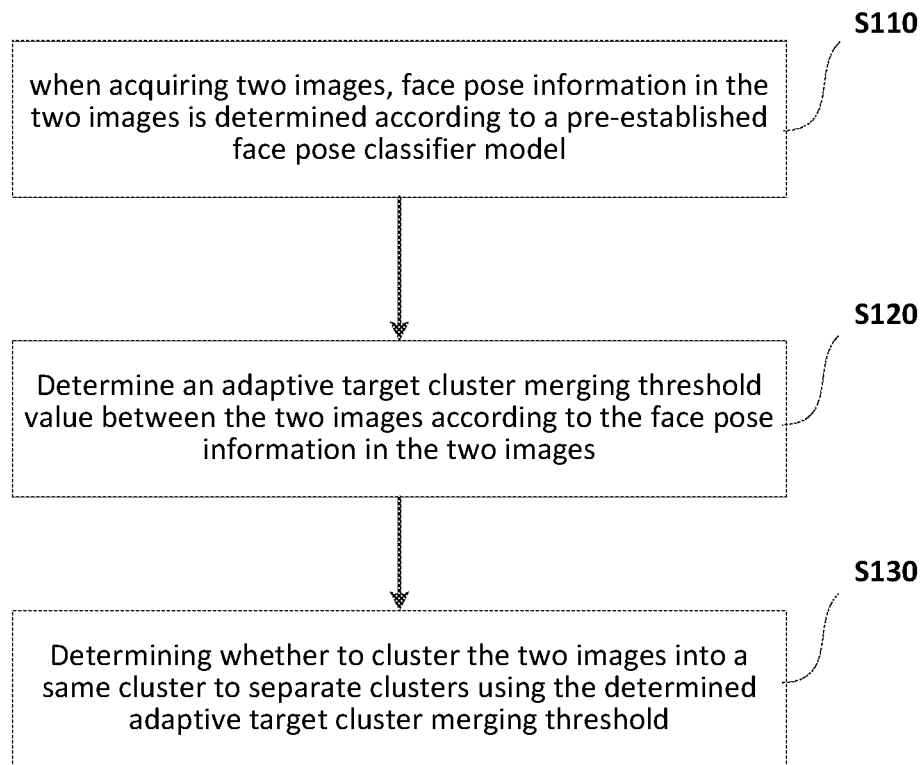
FIG. 1 is a flow chart of an image classification method according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the invention. Instead, they are merely examples of apparatuses and methods consistent with aspects related to the invention as recited in the appended claims.

Terms used in the disclosure are only for purpose of describing particular embodiments, and are not intended to be limiting. The terms "a", "said" and "the" used in singular form in the disclosure and appended claims are intended to include a plural form, unless the context explicitly indicates otherwise. It should be understood that the term "and/or" used in the description means and includes any or all combinations of one or more associated and listed terms.

It should be understood that, although the disclosure may use terms such as "first", "second" and "third" to describe various information, the information should not be limited herein. These terms are only used to distinguish information of the same type from each other. For example, first information may also be referred to as second information, and the second information may also be referred to as the first information, without departing from the scope of the disclosure. Based on context, the word "if" used herein may be interpreted as "when", or "while", or "in response to a determination".

The term "smart terminal", "terminal device", "terminal", "mobile phone", "smart phone", "terminal device", "mobile terminal", "mobile device" and the like are used interchangeably in this disclosure. An "application" or "app" refers to a software program that may be installed on a mobile terminal. An application may appear as an icon on the displayed interface of an operating system of the mobile terminal. An application may be run by a user when activated by the user via appropriate input means (e.g., double click through a mouse-cursor input means, or click of the app icon via a touch screen). An application, when being run on the mobile terminal, may provide a user interface for accepting user instructions and may communicate with an application server via any form of communication channels to obtain services desired by the user.

Image classification using computer algorithms helps organize a vast amount of images taken by electronic devices. Image classification may be based on models established using machine learning algorithms. In particular, training images pre-labeled into a predefined number of categories may be use to establish an image classification model based on machine learning algorithms such as random forest regression, logistic regression, and SVM. Once a classification model is machine-trained and established, an unlabeled input image may then be analyzed via the model and its category among the predetermined number of categories may be determined.

Such an approach may be used in classifying images into pre-determined categories based on human faces. For example, each unique face may be defined as a separate category and an image containing human faces may be classified according to the unique faces it contains. As a result, all images containing the face of a particular person may be classified as one category. Accordingly, the training images used for obtaining a unique face classification model may be pre-labeled with unique persons. However, because of the nearly unlimited number of unique faces that may potentially need to be classified, and a vast training image set that may be required for establishing a reasonably accurate classification model, implementation of a comprehensive human face classification model may be difficult if not unrealistic. Such a classification model is more suitable for limited situations where the images needing classification are bound in that they are confined to a predefined set of unique faces. For example, a user may use a customized model based on machine learning algorithms to classify images containing faces belonging to his/her circle of friends which is limited in number. If an input image contains a face of a stranger that has never appeared in the training image set and thus was not assigned a unique category, the input image may not be accurately classified using the model developed based on the training images.

Image clustering based on human face, however, may be a problem of more general practicability than image classification with predefined categories of unique faces. Image clustering may also be a more tractable problem. Fundamentally, an image clustering algorithm may be used to determine whether two images contain faces of a same person (or similar faces) by calculating a cluster merging value between the two images and comparing it to a predetermined cluster merging threshold. The cluster merging value essentially represents how similar the human faces contained in the two images are. If the cluster merging value is higher than the cluster merging threshold, then the two images may be considered as similar and would be merged as one cluster. However, if the cluster merging value is not higher than the cluster merging threshold, then the two images may be considered to be of different categories and would not be merged into one cluster. A clustering model that may be used to determine or calculate cluster merging values between two images may be based on various algorithms for determining similarities of facial features.

The clustering model for calculating the cluster merging value may be further refined based on machine learning techniques. For example, training images, instead of being pre-labeled into categories of unique human faces, may be pre-labeled pair-wise as either similar or non-similar (for example, pre-labeled as belonging to the same person or not belonging to the same person). The image features used for training may be chosen to focus more on those features that may be used to determine whether two faces are similar. A clustering model based on machine learning algorithms may provide a cluster merging value calculation that more accurately represents the facial similarity. Using the calculated cluster merging value to determine whether two images contain faces of the same person and thus belong to a same cluster thus resembles a binary classification process. Compared to the multi-category classification model discussed above, it may be used to more accurately determine whether two images contain similar faces even though those faces may have not appeared in the training images.

The training images for establishing a clustering model may typically contain human faces with a front view pose. For example, the training images may be a collection of portraits of persons of different age, gender, ethnicity, etc. These training images typically have rich and clear facial characteristics. The cluster merging threshold discussed may be predefined based on the collective similarity between these facial characteristics. In using the resulting clustering model to cluster two input images, the predetermined cluster merging threshold may be reasonably accurate as a dividing line as to whether the two images contain similar faces when the faces contained in the two images are both of front view pose. But when the two images contain faces of other poses, for example, when both images contain side view of human faces, or when one image contains side view pose and the other image contains front view pose, the predetermined clustering threshold may become inaccurate as a dividing value for determining whether the two images contain similar faces.

The embodiments of the current disclosure below provide methods and devices for more accurate image clustering based on human face using an adaptive cluster merging threshold according to a combinational pose of the faces in the images. For example, when the two images both have front view faces, a standard cluster merging threshold as predefined above may be used. When the two images both contain side view faces, the accuracy of the clustering model for determining the cluster merging value may over-estimate the actual similarity between the two side view faces because of a lack of facial features in side view faces leading to excessive false positive similarity determination of dissimilar faces when only side view information is available. As a result, the cluster merging threshold may be modified to a higher value than the standard cluster merging threshold such that the two side faces in the two images may be considered similar only at higher cluster merging value as determined by the clustering model. For another example, when one of the two images contains a side view face but the other image of the two images contains a front view face, the clustering model may under-estimate the similarity between the faces by yielding an under-estimated cluster merging value (reflecting the general statistical observation that a side view and front view of a face of a same person may not be easily recognized as belonging to the same person and thus false negative determination that a side view face and front view face are dissimilar frequently occurs). The under-estimation comes about because of the disparity between side view and front view of even the same face and the resulting difficulty in accurately determining the clustering merging value using the clustering model. As such, the cluster merging threshold to be used in such a scenario may be adjusted downward from the standard cluster merging threshold level to avoid excessive false negative clustering determination.

The terms cluster and classification and their derivatives may be used interchangeably in the disclosure below. As discussed above, determining whether two images should be placed into the same or different clusters may in essence be a binary classification.

For image face clustering based on an adaptive cluster merging threshold, an example of the embodiments of the present disclosure is shown in FIG. 1, the method may include the following steps.

In step S110, when acquiring two images to be classified both containing face features, face pose information in the two images is determined according to a pre-established face pose classification model.

In the embodiment of the present disclosure, the face pose information in each of the two images to be classified may be determined by pre-establishing a face pose classification model. The face pose information of an image represents information such as the existence of human face in the image, the number of faces in the image, and orientation of faces in an image. For example, the face pose information of an image may be described as a front-view face, a side-view face, a left-view face, with face, or two front-view faces, one front-view face and one side-view face. The word "view" may be dropped below. For example, "front-view" face may be simply referred to as "front face". Further, the term "side-view" and "front-view" may alternatively be referred to as "side view" and "front view. Side-view may represent face orientation where the face is facing a direction that is 90 degrees away from the shooting direction of the camera. More broadly, side view may represent face orientation where the face is facing an angle less than 90 degrees, such as 80, 70, 60 degrees and the like, away from the shooting direction of the camera. Similarly, front-view may represent face orientation where the face is facing a direction that is 0 degrees from the shooting direction of the camera and thus facing the camera. More broadly, front-view may represent face orientation where the face is facing at an small angle more than 0 degrees, such as 10, 20, 30 degrees and the like, away from the shooting direction of the camera. The face pose classification model, once more, may be based on machine learning algorithms using training image set pre-labeled with face poses. The categories of face poses may be finer than just front-view and side-view. The face pose categories may include face views of various angles from the front view (with the side-view pose being 90 degrees).

In step S120, a target or adjusted cluster merging threshold value between the two images to be classified is determined according to the face pose information in the two images to be classified (or clustered).

In the embodiments of the present disclosure, after determining the face pose information in the two images to be classified according to the pre-established face pose classification model, the target cluster merging threshold value corresponding to the face pose information should be determined according to the face pose information. In addition, when classifying multiple (e.g., more than two) image photos with a plurality of faces, any two of the image photos may be identified at first to determine whether they contain similar faces and thus may be clustered together. And then a final global clustering or classification result of the multiple image photos with a plurality of faces may be obtained. Alternatively, any one of the image photos may be selected at first, then the selected image photo is compared with other image photos one by one to determine whether two images being compared should be considered as a same cluster, and then the clustering process may be repeatedly performed on the remaining images. The terms "image" and "image photo" may be used interchangeably in this disclosure.

One image photo may contain face of front face pose or side face pose with other angles. For example, two image photos may be two front face image photos, or one front face image photo and one side face image photo, or two side face image photos, or the like. The cluster merging threshold may be adaptively adjusted according to the pose relationship between faces in the two images being compared. In other words, each condition above (e.g., two images both having front faces, both having side faces, on image having side face and the other image having front face) may have an adjusted and thus different corresponding cluster merging threshold value. Further, the side face pose information may include side face pose information with different angles. According to the face pose information in the two images to be clustered or classified, the adaptive cluster merging threshold value between the two images to be used as the target cluster merging threshold may be determined by looking up a look-up table or by automatic generation using a suitable algorithm. Details for determining the adaptive cluster merging threshold will be discussed later with respect to FIG. 2.

In step S130, the two images are clustered/classified by using the determined adaptively adjusted target cluster merging threshold value.

Thereby, when the cluster merging value of the two images to be classified is greater than the adaptive target cluster merging threshold value, it indicates that the two images belong to the same type or cluster; otherwise, they do not belong to the same type or cluster.

In the image classification method provided by the embodiments of the present disclosure, when clustering two images, the face pose information of the two images are determined according to the pre-established face pose classification model, then the target cluster merging threshold value between the two images is adaptively determined according to the face pose information, and then the two images are clustered into a same cluster or separate clusters according to the target cluster merging threshold value. By determining the face pose information, whether the two images belong to the same type or cluster of images can be determined more accurately, and the image classification efficiency can be improved further.

Figure 2:
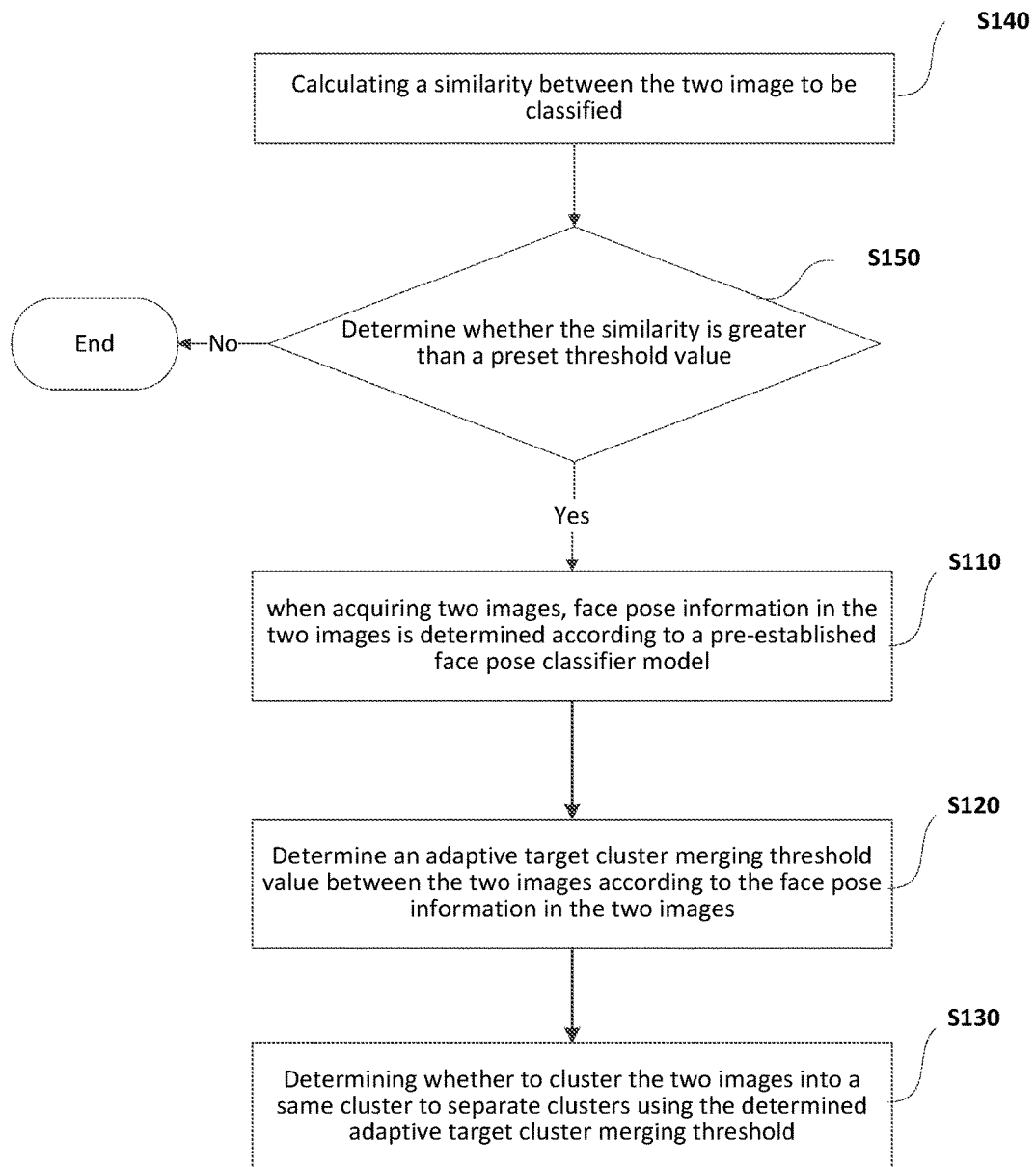
FIG. 2 is a flow chart of an image classification method according to another exemplary embodiment.

As a refining of the method in FIG. 1, in another embodiment, as shown in FIG. 2, the method may further include the following steps.

In step S140, a similarity between the two images to be classified is calculated.

In step S150, whether the similarity is greater than a preset threshold value is determined.

When the similarity is greater than the preset threshold value, step S110 is performed.

When the similarity is not greater than the preset threshold value, the process ends.

The embodiments of the present disclosure are mainly used to classify two images having a certain similarity, i.e., when it is unable to judge whether the two images belong to the same type or cluster of images only via the image similarity analysis, the embodiments provided by the present disclosure may further improve the accuracy of the classification of the two images to be classified. If the similarity of the two images to be classified is smaller than a certain similarity threshold, i.e., when it is determined that the two images to be classified are obviously not the same type of images, it is unnecessary to adopt the method provided by the present disclosure. Thereby, when the similarity between the two images to be classified is at least within a certain similarity range, the present disclosure is applicable in further determining whether the two images contain similar faces using adaptive cluster merging threshold related to human face.

Figure 3:
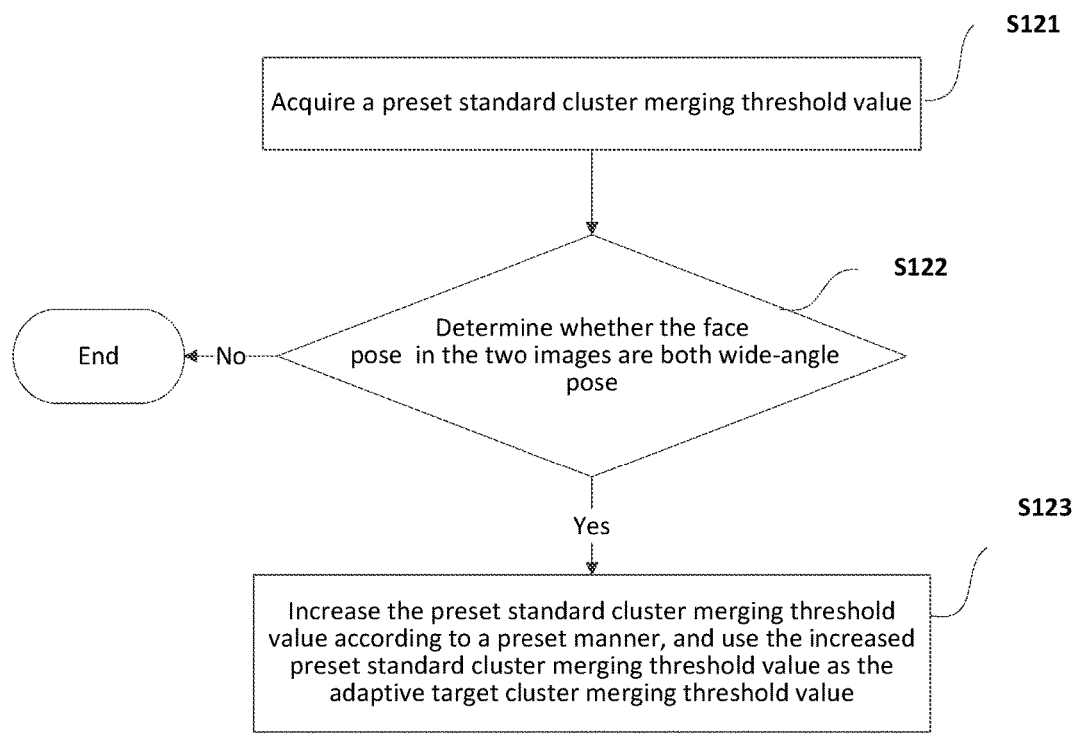
FIG. 3 is a flow chart of one implementation of step S120 in FIG. 1.

In order to determine the adaptive cluster merging threshold value when both the face pose information in the two images to be classified are pose information of wide-angle away from front view, and then perform clustering according to the adaptive cluster merging threshold value, step S120 of FIG. 1 may be implemented by the example embodiment of FIG. 3 which may further include the following steps.

In step S121, a preset standard cluster merging threshold value is acquired.

In step S122, it is determined whether the face poses in the two images to be classified are both poses of wide-angle. Wide-angle may be defined as any large angle away from front view. For example, human face orientation angle larger than 70 degrees from front view may be considered wide-angle.

When the face poses in the two images are determined to be of wide-angle, in step S123, the preset standard cluster merging threshold value is adaptively increased according to a preset manner, and the increased preset cluster merging threshold value is used as the adaptive target cluster merging threshold value.

Face poses of wide-angle in both of the two images indicate that the two images to be classified contain few face features. The clustering model may over-estimate the similarity between the two faces because faces of very different individuals may appear similar when they are both of wide-angle pose. It may thus be necessary to increase the cluster merging threshold value so as to reduce false positive determination of similarity and improve the accuracy of clustering.

Figure 4:
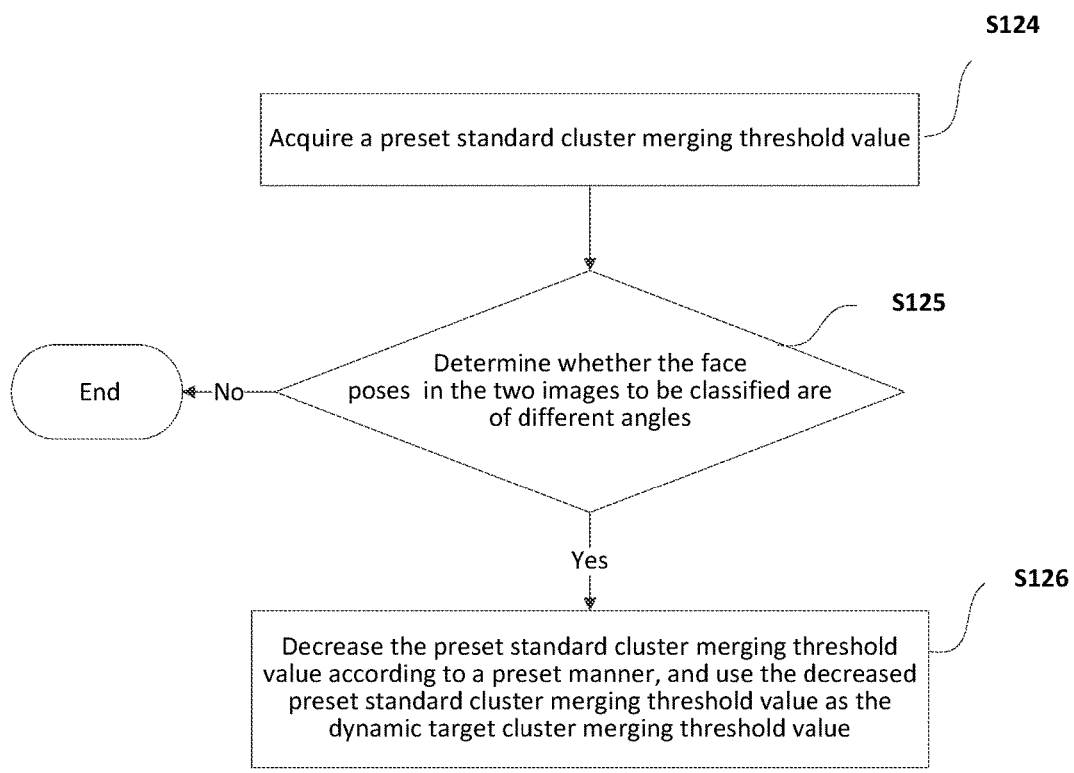
FIG. 4 is a flow chart of another implementation of step S120 in FIG. 1.

In order to determine the adaptive cluster merging threshold value when the face poses in the two images are of different angles, and then perform clustering according to the adaptive cluster merging threshold value, step S120 of FIG. 1 may be implemented as the example embodiment of FIG. 4 which further include the following steps.

In step S124, a preset standard cluster merging threshold value is acquired.

In step S125, it is determined whether the face poses in the two images to be classified are of different angles. Whether the face pose of the two images are of different angle may be based on a predetermined pose difference angle. For example, two poses having a pose angle difference of more than 40 degrees may be considered poses of different angles. Other predetermined pose difference angles are contemplated.

When the face poses in the two images to be classified are determined to be of different angles, in step S126, the preset standard cluster merging threshold value may be decreased according to a preset manner, and the decreased preset standard cluster merging threshold value is used as the adaptive target cluster merging threshold value.

Face poses of different angles (above the predetermined pose difference angle) may indicate that face poses of the two images are of great disparity. The similarity of the two faces may thus be under-estimated by the clustering model. Such under-estimation reflects the general difficulty in recognizing that two faces of a large pose angle difference (e.g., a side view face and a front view face) are similar even if the two phases belong to a same person. It thus may be necessary to decrease the preset standard cluster merging threshold value so as to reduce false negative determination of similarity by the clustering model and improve the accuracy of classification.

Figure 5:
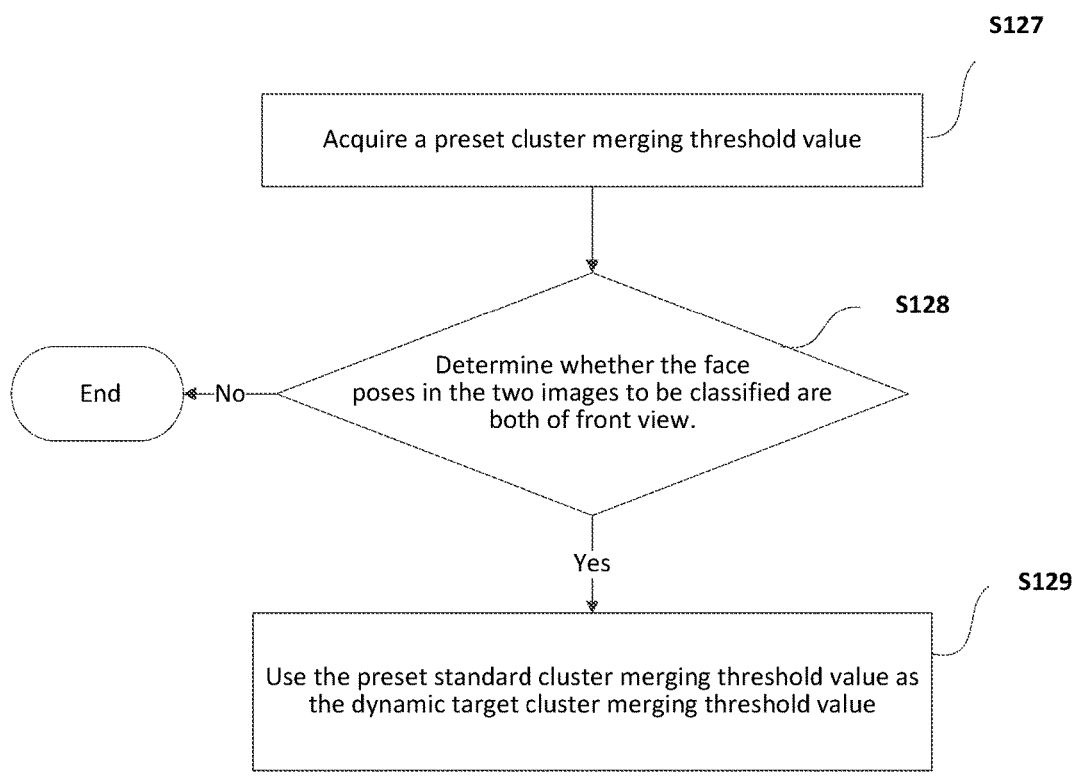
FIG. 5 is a flow chart of yet another implementation of step S120 in FIG. 1.

In order to determine the cluster merging threshold value when both face poses in the two images to be classified are of front face, and then perform the clustering according to the adaptive cluster merging threshold value, step S120 of FIG. 1 may be implemented as the example embodiment of FIG. 5 which further include the following steps.

In step S127, a preset standard cluster merging threshold value is acquired.

In step S128, it is determined whether the face poses in the two images to be classified are both front view.

When the face poses in the two images to be classified are both of front view, in step S129, the preset standard cluster merging threshold value may be used as the adaptive target cluster merging threshold value without any further modification.

Face poses of front view in both images indicate that the two images to be classified both contain rich face features, and at this time, the preset standard cluster merging threshold value established mainly for front view faces may be suitable and directly used as the adaptive target cluster merging threshold value without further modification.

Hereinafter, detailed explanations will be given to the above-mentioned three types of relative face pose between the two images, i.e., both the face poses in the two images to be classified are of wide-angle, face poses in the two images to be classified are of different angles, and both the face poses in the two images to be classified are of front view.

In order to determine the face pose information in the images to be classified, such as whether a face in the image to be classified is a front face, or is a side face appeared in a certain angle, it is necessary to extract face feature information from the image to be classified, and determine the face pose in the image to be classified using the extracted the face feature information. For example, a three-dimensional system of coordinates along a horizontal direction, a vertical direction and a perpendicular direction may be established for the front face, and the feature information, such as characteristic information of eyes, a nose, and ears in the image is extracted to determine the face pose of the image to be classified.

The extraction of the face feature information in the image to be classified may be performed by pre-establishing a face pose classification model and then determining the face pose information in the image to be classified. The face pose information may include deviation of the face orientation from a certain direction. For example, the face pose information in the image to be classified may be determined as turning 20 degrees to the left.

In particular, a face pose sample library may be established by collecting various sample image photos of various face poses. For example, the face pose sample library may include 1000 front face pose photo images, 1000 ten-degree face pose photo images, 1000 twenty-degree face pose photo images, and the like. Illustratively, a ten-degree face pose photo image may mean that the angle between the face orientation and the shooting direction of the camera is ten degrees. The number of angles and number of photos for each angle in the library may be set according to actual needs. In order to improve the accuracy of determination to the face poses by the face pose classification model, the face photos included in the face pose sample library shall include photo images of men and women. For another example, the face photos included in the face pose sample library may include photo images of elders, children, and the like.

After completion of the face pose sample library, the photo images in the established face pose sample library may be trained by existing classifiers or machine learning algorithms so as to obtain the face pose classification model. For example, the photo images in the face pose sample library may be used as training images in a non-linear classifier so as to obtain the face pose classification model. For example, the photo images in the face pose sample library may be used as training images in machine learning algorithms such as SVM (Support Vector Machine) or CNN (convolutional neural networks) so as to obtain the face pose classification model.

Figure 6:
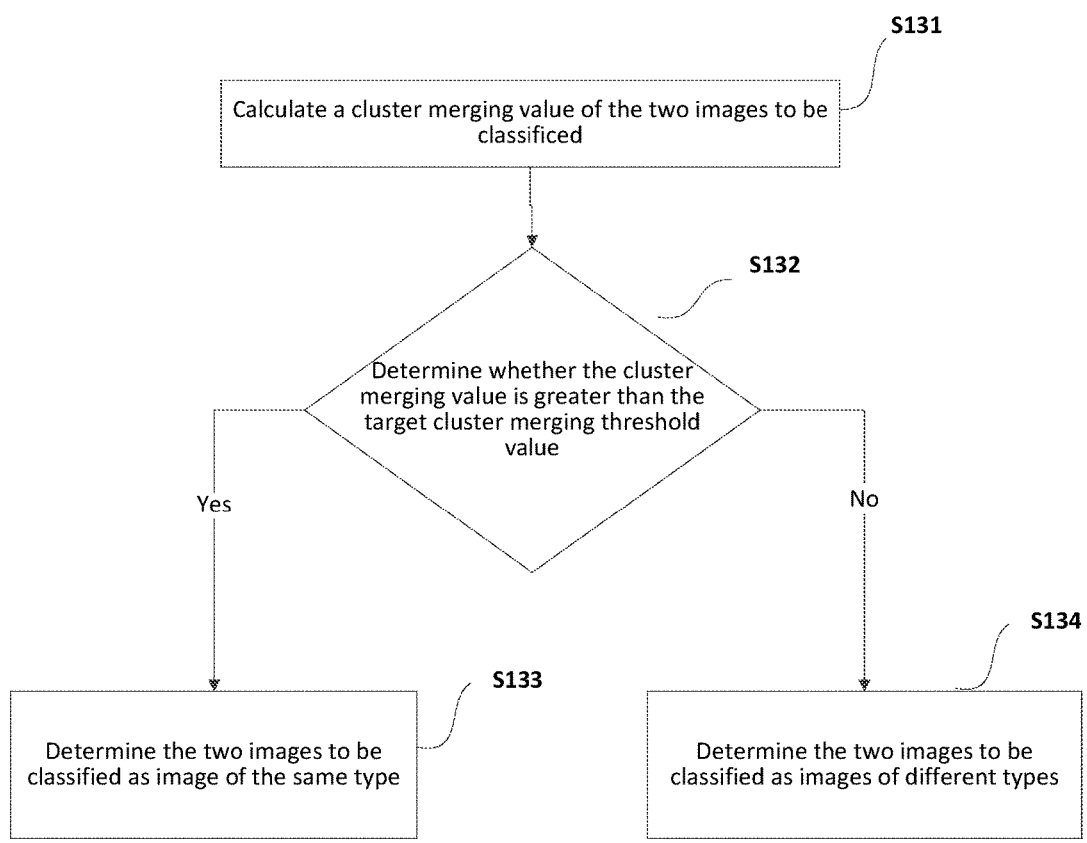
FIG. 6 is a flow chart of one implementation of step S130 in FIG. 1.

As a further refinement of the method in FIG. 1, in another embodiment, as shown in FIG. 6, the step S130 may further include the following steps.

In step S131, a cluster merging value of the two images to be classified is calculated based on the clustering model.

In step S132, it is determined whether the cluster merging value is greater than the adaptive target cluster merging threshold value (determined in step 120 of FIG. 1 and illustrated in more detail in FIGS. 3, 4, and 5).

When the cluster merging value is greater than the adaptive target cluster merging threshold value, in step S133, the two images to be classified are deemed to be of a same type or cluster.

When the cluster merging value is not greater than the adaptive target cluster merging threshold value, in step S134, the two images to be classified are deemed to be of different types or clusters.

By comparing the cluster merging value of the two images to be classified with the adaptive target cluster merging threshold value, it is possible to conveniently and accurately determine whether the two images to be classified belong to the same type or cluster of images.

In the image classification method provided by the embodiments of the present disclosure, when classifying the two images, the face pose information in the two images to be classified are determined according to the pre-established face pose classification model, then an adaptive target cluster merging threshold value between the two images to be classified is determined, and then the two images to be classified are clustered according to the adaptive target cluster merging threshold value. By determining the face pose information, it is able to determine whether the two images to be classified belong to the same type or cluster of images more accurately, and thereby improving the image classifying and clustering efficiency.

By the above depiction of the method embodiments, those skilled in the art could clearly understand that the present disclosure may be implemented by using software with necessary general hardware platform, and may also be implemented by hardwares. In many cases, the former is a preferable embodiment. Based on such understanding, the essence or the portion contributing to the improvement over the prior art of the technical solution of the present disclosure may be embodied in a form of software product. The computer software product may be stored in a storage medium, including instructions for making a computer device (which may be a personal computer, a server, a network device, or the like) perform all or part of the steps in the methods described in respective embodiments of the present disclosure. The above described storage medium includes various mediums which may store program codes, such as a read-only memory (ROM), a random-access memory (RAM), a magnetic or optical disk.

Figure 7:
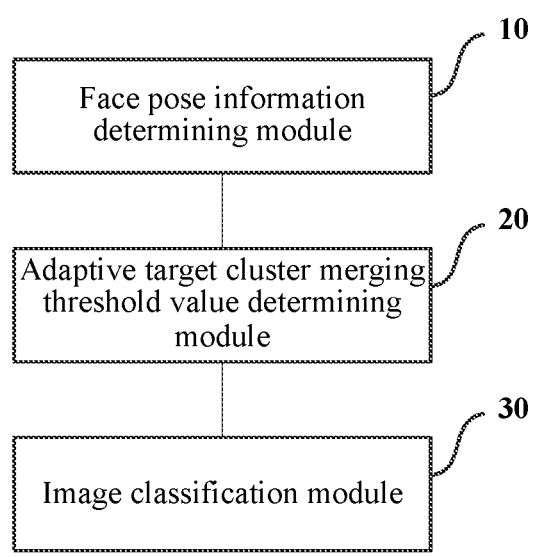
FIG. 7 is a schematic diagram of an image classification device according to an exemplary embodiment.

In addition, as an implementation of the above-mentioned respective embodiments, the embodiments of the present disclosure also provide an image classification device located in a terminal. The term terminal, terminal device, mobile device, mobile terminal, and the like may be used interchangeably in this disclosure. As shown in FIG. 7, the device includes: a face pose information determining module 10, an adaptive target cluster merging threshold value determining module 20, and an image classification module 30.

The face pose information determining module 10 is configured to, when acquiring two images to be classified and both of them containing face feature information, determine face pose information in the two images to be classified according to a pre-established face pose classification model.

In the embodiments of the present disclosure, the face pose information in the two images to be classified may be determined according to the pre-established face pose classification model. A face pose of an image may be a front face, a side face, a left face, a face, or two front face images.

The adaptive target cluster merging threshold value determining module 20 is configured to determine an adaptive target cluster merging threshold value between the two images to be classified according to the face pose information in the two images to be classified.

In the embodiments of the present disclosure, after determining the face pose information in the two images to be classified according to the pre-established face pose classification model, an adaptive target cluster merging threshold value corresponding to the face pose information should be determined according to the face pose information. In addition, when classifying or clustering image photos with a plurality of faces, any two of the image photos may be identified at first to determine whether they are photos of a same person, and then an overall classification or clustering of the image photos with a plurality of faces may be obtained. Also, any one of the image photos may be selected at first, then the selected image photo may be compared with other image photos one by one to determine whether this selected image photo is of the same cluster with each of the other image photos, and further clustering of the remaining image photos may be repeatedly performed in a same way.

One image photo may be of front face pose with a pose angle of zero degree or of side face pose with pose angles other than zero degree. In combination, two face-containing image photos may both contain front view face, or one of the image photos may contain front view face and the other image photo may contain side view face, or both image photos may both contain two side view face, or the like. Each situation may correspond to a different adaptive cluster merging threshold value. A side face pose may be further characterized by different pose angles. According to the face pose combination scenario in the two images to be classified, the adaptive cluster merging threshold value between the two images to be classified may be determined by looking up a look-up table or by an automatic mathematic algorithm. The adaptive cluster merging threshold value may then be used as the target cluster merging threshold value.

The image classification module 30 is configured to classify the two images to be classified by using the determined adaptive target cluster merging threshold value. Thereby, when the cluster merging value of the two images to be classified is greater than the adaptive target cluster merging threshold value, it indicates that the two images to be classified belong to the same type or cluster; otherwise, they do not belong to the same type or cluster.

In the image classification device provided by the embodiments of the present disclosure, when classifying two images, the combinational face pose information of the two images to be classified are determined according to the pre-established face pose classification model. Then the adaptive target cluster merging threshold value between the two images to be classified is determined. The two images to be classified are then classified or clustered according to the adaptive target cluster merging threshold value. By determining the combinational face pose information, whether the two images to be classified belong to the same type or cluster of images can be determined more accurately, and the image classification or clustering efficiency can be improved further.

Figure 8:
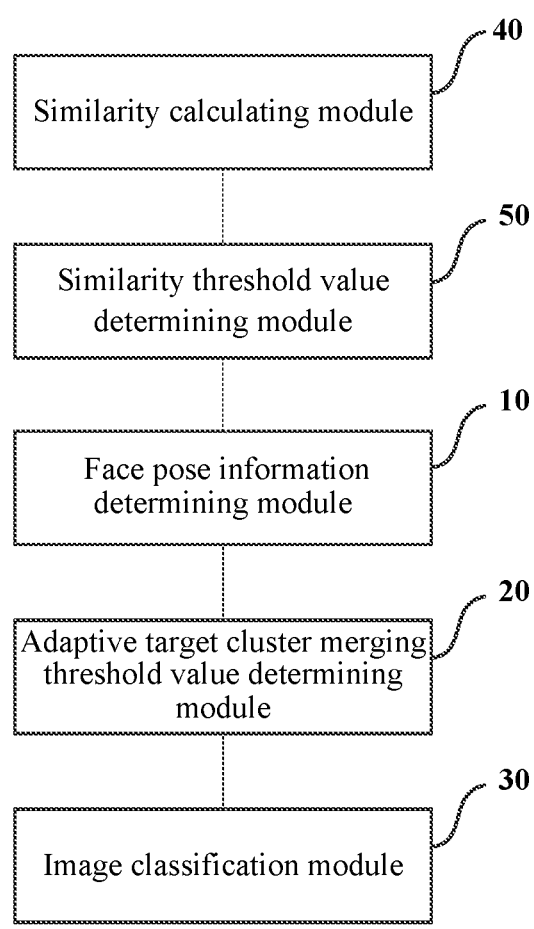
FIG. 8 is a schematic diagram of an image classification device according to another exemplary embodiment.

In another embodiment provided by the present disclosure, based on FIG. 7, as shown in FIG. 8, the device further includes a similarity calculating module 40 and a similarity threshold value determining module 50.

The similarity calculating module 40 is configured to calculate a similarity between the two images to be classified.

The similarity threshold value determining module 50 is configured to determine whether the similarity is greater than a preset threshold value.

Figure 9:
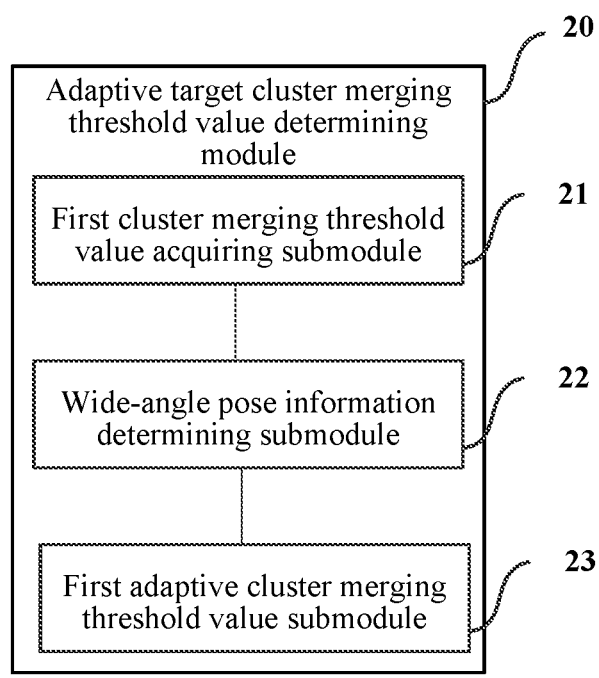
FIG. 9 is a schematic diagram of one implementation of the adaptive target cluster merging threshold value determining module in FIG. 7.

The embodiments of the present disclosure are mainly used to cluster two images based on face poses when the two image already have a certain similarity, i.e., when it is unable to determine whether the two images belong to the same type or cluster of images via the similarity analysis only, the embodiments provided by the present disclosure may further improve the accuracy of the face classification or clustering of the two images. If the similarity analysis of the two images to be classified shows similarity smaller than a certain similarity, i.e., when it is determined that the two images to be classified are obviously not the same type of images, it is unnecessary to further adopt the method provided by the present disclosure. Thereby, when the similarity between the two images to be classified is at least within a certain similarity range, the present disclosure is applicable in further cluster the images based on face poses In another embodiment provided by the present disclosure, based on FIG. 7, as shown in FIG. 9, the adaptive target cluster merging threshold value determining module 20 includes: a first cluster merging threshold value acquiring submodule 21, a wide-angle pose information determining submodule 22, and a first adaptive target cluster merging threshold value submodule 23.

The first cluster merging threshold value acquiring submodule 21 is configured to acquire a preset standard cluster merging threshold value.

The wide-angle pose information determining submodule 22 is configured to determine whether the face poses in the two images to be classified are both of wide-angle.

The first adaptive target cluster merging threshold value submodule 23 is configured to, when the face poses in the two images to be classified are both of wide-angle, increase the preset cluster merging threshold value according to a preset manner, and use the increased preset cluster merging threshold value as the adaptive target cluster merging threshold value.

Face poses of wide-angle indicate that the two images to be classified contain few face features, and it may be necessary to increase the cluster merging threshold value so as to improve the accuracy of classification.

Figure 10:
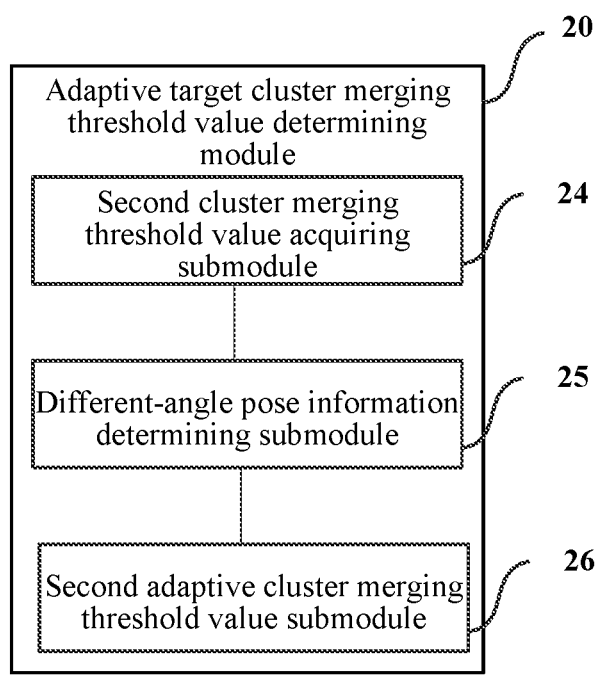
FIG. 10 is a schematic diagram of another implementation of the adaptive target cluster merging threshold value determining module in FIG. 7.

In another embodiment provided by the present disclosure, based on FIG. 7, as shown in FIG. 10, the adaptive target cluster merging threshold value determining module 20 includes: a second cluster merging threshold value acquiring submodule 24, a different-angle pose information determining submodule 25, and a second adaptive target cluster merging threshold value submodule 26.

The second cluster merging threshold value acquiring submodule 24 is configured to acquire a preset standard cluster merging threshold value.

The different-angle pose information determining submodule 25 is configured to determine whether the face poses in the two images to be classified are of different pose angles.

The second adaptive target cluster merging threshold value submodule 26 is configured to, when the face poses in the two images to be classified are of different pose angles, decrease the preset cluster merging threshold value according to a preset manner, and use the decreased preset cluster merging threshold value as the adaptive target cluster merging threshold value.

Face poses of different angles indicate that face features in the two images to be classified are disparate, and it may be necessary to decrease the cluster merging threshold value so as to improve the accuracy of classification.

Figure 11:
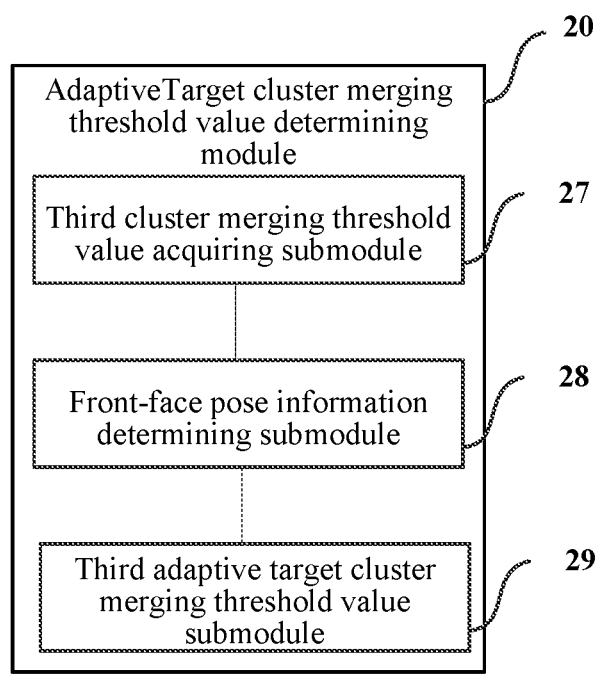
FIG. 11 is a schematic diagram of yet another implementation of the adaptive target cluster merging threshold value determining module in FIG. 7.

In another embodiment provided by the present disclosure, based on FIG. 7, as shown in FIG. 11, the adaptive target cluster merging threshold value determining module 20 includes: a third cluster merging threshold value acquiring submodule 27, a front-face pose information determining submodule 28, and a third adaptive target cluster merging threshold value submodule 29.

The third cluster merging threshold value acquiring submodule 27 is configured to acquire a preset standard cluster merging threshold value.

The front-face pose information determining submodule 28 is configured to determine whether the face poses in the two images to be classified are both of front view.

The third adaptive target cluster merging threshold value submodule 29 is configured to, when the face poses in the two images to be classified are both of front view, use the preset standard cluster merging threshold value as the adaptive target cluster merging threshold value without further modification.

Face poses of front view it indicate that the two images to be classified contain rich facial features, and thus, the preset standard cluster merging threshold value may be directly used as the adaptive target cluster merging threshold value.

Figure 12:
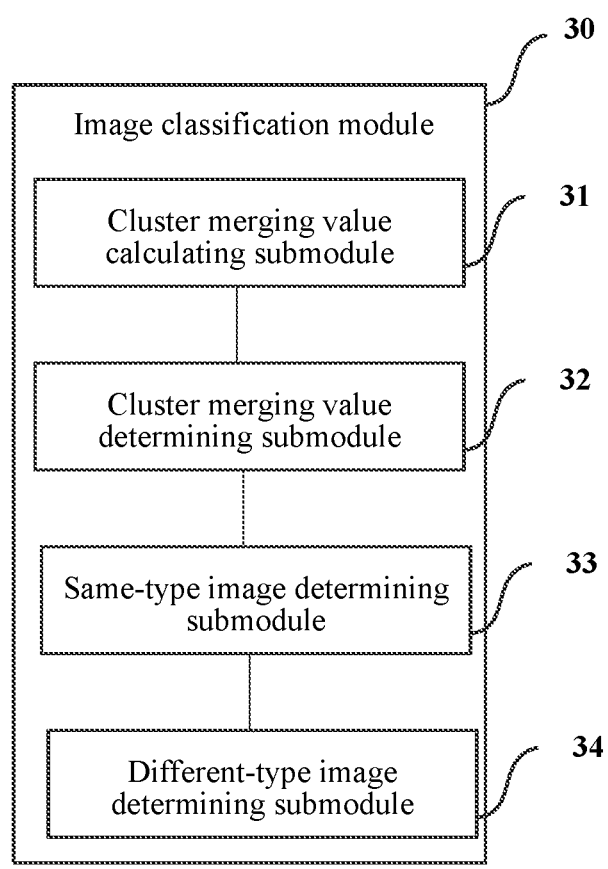
FIG. 12 is a schematic diagram of one implementation of the image classification module in FIG. 7.

In another embodiment provided by the present disclosure, based on FIG. 7, as shown in FIG. 12, the image classification module 30 includes: a cluster merging value calculating submodule 31, a cluster merging value determining submodule 32, a same-type image determining submodule 33, and a different-type image determining submodule 34.

The cluster merging value calculating submodule 31 is configured to calculate a cluster merging value of the two images to be classified based on the clustering model.

The cluster merging value determining submodule 32 is configured to determine whether the cluster merging value is greater than the adaptive target cluster merging threshold value.

The same-type image determining submodule 33 is configured to, when the cluster merging value is greater than the adaptive target cluster merging threshold value, determine that the two images to be classified are images of the same type or cluster.

The different-type image determining submodule 34 is configured to, when the cluster merging value is not greater than the adaptive target cluster merging threshold value, determine that the two images to be classified are images of different types or clusters.

By comparing the cluster merging value of the two images to be classified with the adaptive target cluster merging threshold value, it is possible to conveniently and accurately determine whether the two images to be classified belong to the same type or cluster of images.

In the image classification or clustering device provided by the embodiments of the present disclosure, when classifying two images having a relatively high similarity, the face pose information of the two images to be classified is obtained, and then the pose information of the two images to be classified having a relatively high similarity is determined, so as to determine the adaptive cluster merging threshold value corresponding to the pose information of the two images to be classified. When the calculated cluster merging value of the two images to be classified is greater than the adaptive cluster merging threshold value, the two images to be classified are deemed to be of the same type or cluster. In this way, high error rate of image classification that occurs when directly determining whether the two images to be classified belong to the same type of images only by the similarity in the images could be effectively reduced.

In addition, when the face poses in the two images to be classified are of different combination, the cluster merging threshold values corresponding to the a particular pose combination of the two images may be adapted. For example, when the poses of the two images to be classified are relatively similar and are of large angle, the cluster merging threshold value may be adjusted to be higher. If the poses of the two images to be classified are different (for example, one of them is of left side face pose, and the other is of front face pose), the cluster merging threshold value t may be adjusted to be lower. If both the poses of the two images to be classified are of front view, the cluster merging threshold value therebetween may not be adjusted. As such, the cluster merging threshold values corresponding to the pose information of the two images to be classified may be adaptive, and it is possible to more accurately determine whether the two images to be classified are photo images of a same person or cluster.

Figure 13:
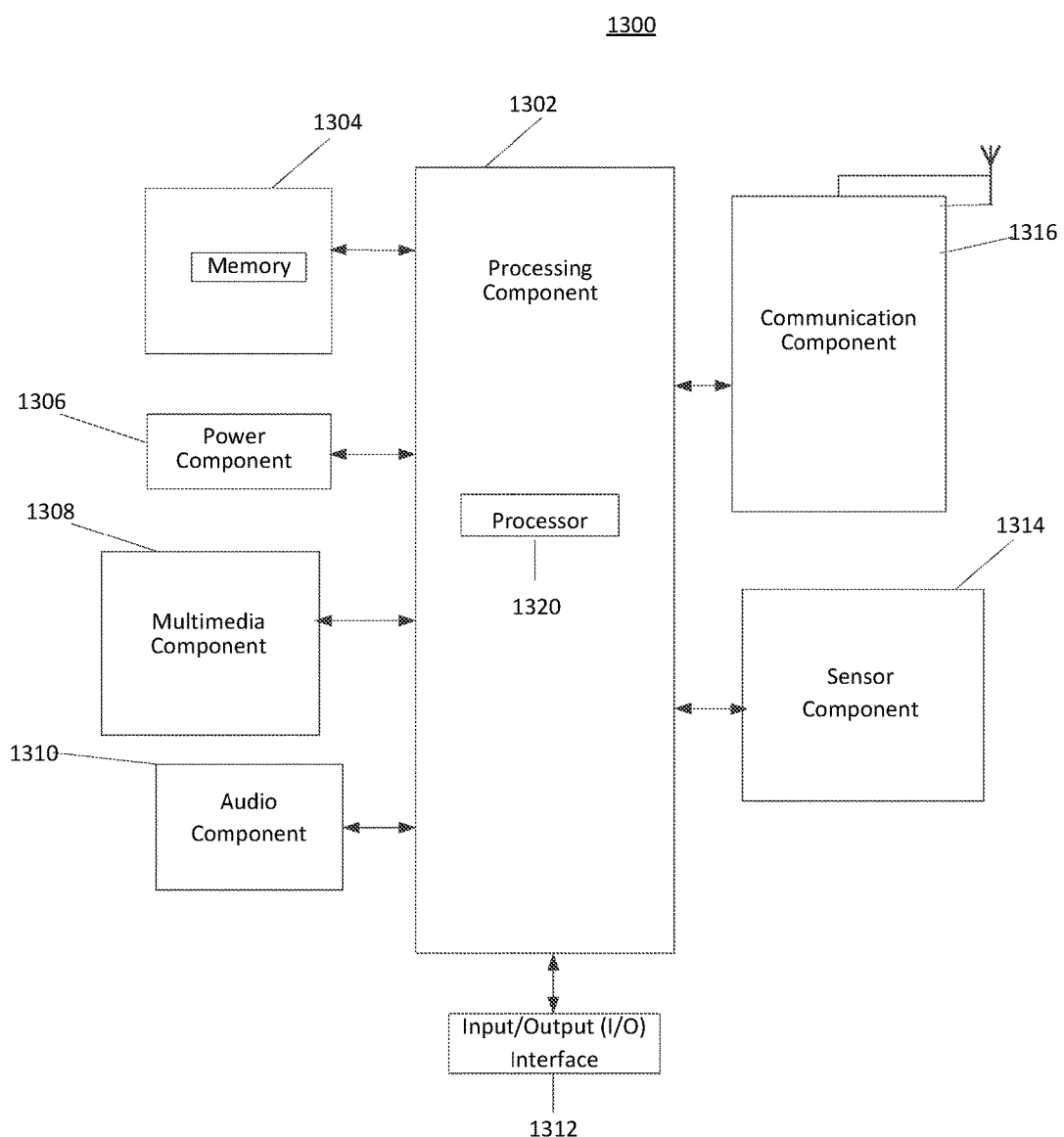
FIG. 13 is a block diagram of a terminal device according to an exemplary embodiment.

FIG. 13 is a block diagram of an image classification device 1300, according to an exemplary embodiment. For example, the device 1300 may be a mobile phone, a computer, a digital broadcast terminal, a messaging device, a gaming console, a tablet, a medical device, exercise equipment, a personal digital assistant, and the like.

Referring to FIG. 13, the device 1300 may include one or more of the following components: a processing component 1302, a memory 1304, a power component 1306, a multimedia component 1313, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1313 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1313 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1313 includes a front camera and/or a rear camera. The front camera and/or the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like.

The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, or 3G, LTE, and 4G cellular technologies or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 1304 including instructions, the above instructions are executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium is executed by a processor of a mobile terminal, enables the mobile terminal to perform an image classification method, the method including:

when acquiring two images to be classified containing face feature information, determining face pose information in the two images to be classified respectively according to a pre-established face pose classification model;

determining a target cluster merging threshold value between the two images to be classified according to the face pose information in the two images to be classified; and classifying the two images to be classified by using the determined target cluster merging threshold value.

Each module or unit discussed above for FIGS. 7-12, such as the face pose information determining module, the adaptive target cluster merging threshold value determining module, the image classification module, the similarity calculating module, the similarity threshold value determining module, the first/second/third cluster merging threshold value acquiring submodule, the wide-angle pose information determining submodule, the first/second/third adaptive cluster merging threshold value submodule, the different-angle pose information determining submodule, the front-face pose information determining submodule, the cluster merging value calculating submodule, the cluster merging value determining submodule, the same-type image determining submodule, and the different-type image determining submodule may take the form of a packaged functional hardware unit designed for use with other components, a portion of a program code (e.g., software or firmware) executable by the processor 1320 or the processing circuitry that usually performs a particular function of related functions, or a self-contained hardware or software component that interfaces with a larger system, for example.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An image classification method, comprising:
    acquiring two images including a first image depicting a first face and a second image depicting a second face;
    calculating a similarity between the first face and the second face;
    determining the calculated similarity is greater than a preset similarity threshold value;
    determining a first face pose information for the first image, the first face pose information including a first orientation value of the first face;
    determining a second face pose information for the second image, the second face pose information including a second orientation value of the second face, wherein both the first face pose information and the second face pose information are selected from a pre-established face pose classification mode;
    determining, based on the first face pose information and the second face pose information, an angular face relationship between the first face and the second face;
    determining an adaptive target cluster merging threshold value based on the angular face relationship; and
    clustering the first image and the second image into a same, or different, cluster according to the determined adaptive target cluster merging threshold value.

2. The method of claim 1, wherein determining the adaptive target cluster merging threshold value comprises:

acquiring a preset cluster merging threshold value;
determining the angular face relationship indicates that the first image and the second image both contain side-view face poses; and
increasing the preset cluster merging threshold value and using the increased preset cluster merging threshold value as the adaptive target cluster merging threshold value.

3. The method of claim 1, wherein determining the adaptive target cluster merging threshold value comprises:
acquiring a preset cluster merging threshold value;
determining the angular face relationship indicates that the first image and the second image contain face poses of different angles; and
decreasing the preset cluster merging threshold value and using the decreased preset cluster merging threshold value as the adaptive target cluster merging threshold value.

4. The method of claim 1, wherein determining the adaptive target cluster merging threshold value comprises:
acquiring a preset cluster merging threshold value;
determining the angular face relationship indicates that the first image and the second image both contain front view face poses; and
using the preset cluster merging threshold value as the adaptive target cluster merging threshold value.

5. The method of claim 1, wherein clustering the first image and the second image comprises:
calculating a cluster merging value;
determining the calculated cluster merging value is greater than the adaptive target cluster merging threshold value; and
determining that the first image and the second image belong to a same cluster.

6. A terminal, comprising:
a processor; and
a memory in communication to the processor for storing instructions executable by the processor;
wherein the processor is configured to:
acquire two images including a first image depicting a first face and a second image depicting a second face;
calculate a similarity between the first face and the second face;
determine the calculated similarity is greater than a preset similarity threshold value;
determine a first face pose information for the first image, the first face pose information including a first orientation value of the first face;
determine a second face pose information for the second image, the second face pose information including a second orientation value of the second face, wherein both the first face pose information and the second face pose information are selected from a pre-established face pose classification mode;
determine, based on the first face pose information and the second face pose information, an angular face relationship between the first face and the second face;
determine an adaptive target cluster merging threshold value based on the angular face relationship; and
cluster the first image and the second image into a same, or different, cluster according to the determined adaptive target cluster merging threshold value.

7. The terminal of claim 6, wherein, to determine the adaptive target cluster merging threshold value, the processor is further configured to:
acquire a preset cluster merging threshold value;
determine the angular face relationship indicates that the first image and the second image both contain side view face poses; and
increase the preset cluster merging threshold value according and use the increased preset cluster merging threshold value as the adaptive target cluster merging threshold value.

8. The terminal of claim 6, wherein, to determining the adaptive target cluster merging threshold value, the processor is further configured to:
acquire a preset cluster merging threshold value;
determine the angular face relationship indicates that the first image and the second image contain face poses of different angles; and
decrease the preset cluster merging threshold value and use the decreased preset cluster merging threshold value as the adaptive target cluster merging threshold value.

9. The terminal of claim 6, wherein, to determining the adaptive target cluster merging threshold value, the processor is further configured to:
acquire a preset cluster merging threshold value;
determine the angular face relationship indicates that the first image and the second image both contain front view face poses; and
use the preset cluster merging threshold value as the adaptive target cluster merging threshold value.

10. The terminal of claim 6, wherein, to cluster the first image and the second image, the processor is further configured to:
calculate a cluster merging value;
determine the calculated cluster merging value is greater than the adaptive target cluster merging threshold value; and
determine the first image and the second image belong to a same cluster.

11. A non-transitory computer readable storage medium comprising instructions, wherein the instructions, when executed by a processor in a terminal device, cause the terminal device to:
acquire two images including a first image depicting a first face and a second image depicting a second face;
calculate a similarity between the first face and the second face;
determine the calculated similarity is greater than a preset similarity threshold value:
determine a first face pose information for the first image, the first face pose information including a first orientation value of the first face;
determine a second face pose information for the second image, the second face pose information including a second orientation value of the second face, wherein both the first face pose information and the second face pose information are selected from a pre-established face pose classification mode;
determine, based on the first face pose information and the second face pose information, an angular face relationship between the first face and the second face;
determine a adaptive target cluster merging threshold value based on the angular face relationship; and cluster the first image and the second image into a same, or different, cluster according to the determined adaptive target cluster merging threshold value.

\* \* \* \* \*